United States Patent [19]
Kanayama

[11] Patent Number: 5,382,801
[45] Date of Patent: Jan. 17, 1995

[54] METHOD FOR PRODUCING MINUTE PARTICLES AND APPARATUS THEREFOR

[75] Inventor: Toshihiko Kanayama, Tsukuba, Japan

[73] Assignee: Agency of Industrial Science and Technology, Tokyo, Japan

[21] Appl. No.: 35,688

[22] Filed: Mar. 23, 1993

[30] Foreign Application Priority Data

Apr. 15, 1992 [JP] Japan .................. 4-121189

[51] Int. Cl.$^6$ ............................. B01D 59/44
[52] U.S. Cl. ........................ 250/423 R; 250/283
[58] Field of Search ............... 250/423 R, 282, 292, 250/290, 291, 283

[56] References Cited

U.S. PATENT DOCUMENTS

| | | | |
|---|---|---|---|
| Re. 34,000 | 7/1992 | Syka et al. | 250/292 |
| 4,755,670 | 7/1988 | Syka et al. | 250/292 |
| 4,835,392 | 5/1989 | Löschner et al. | 250/492.2 |
| 4,870,284 | 9/1989 | Hashimoto et al. | 250/423 R |
| 4,990,856 | 2/1991 | Anderson et al. | 250/291 |
| 5,051,582 | 9/1991 | Bahns et al. | 250/283 |
| 5,155,651 | 10/1992 | Yoda et al. | 361/144 |
| 5,179,278 | 1/1993 | Douglas | 250/290 |

OTHER PUBLICATIONS

Prior, "Radiative decay rates of metastable Ar III and CU II ions", Physical Review A, vol. 30, No. 6, (Dec. 1984), pp. 3051–3056.

Kingdon, "A Method for the Neutralization of Electron Space Charge by Positive Ionization At Very Low Gas Pressures", pp. 408–418.

Prior et al., "Electron capture by trapped Ne$^{q+}$ ions at very low energies", Physical Review A, vol. 28, No. 1, (Jul. 1983), pp. 141–150.

Yu et al., "Demonstrations of new Paul–Straubel trap for trapping single ions", J. Appld. Phys. 69 (6), (Mar. 15th 1991), pp. 3779–3781.

Fischer, "Die dreidimensionale Stabilisierung von Ladungsträgern in einem Vierpolfeld*", Zeitschrift für Physik 156, 1–26 (1939), pp. 1–26.

Paul et al., "Das elektrische Massenfilter als Massengspektrometer und Isotopentrenner", Zeitschrift für Physik, Bd. 152, (1958), pp. 143–182.

H. G. Dehmelt, *Radiofrequency Spectroscopy of Stored Ions I: Storage,* pp. 54–72 *II: Spectioscopy,* pp. 108–125; 146–147.

F. G. Major et al, "Exchange-Collision Technique for the rf Spectroscopy of Stored Ions", *Physical Review,* vol. 170, No. 1, Jun. 5th, 1968, pp. 91–107.

R. F. Wuerker et al, "Electrodynamic Containment of Charged Particles", *Journal of Applied Physics,* vol. 30, No. 3, Mar. 1959, pp. 342–349.

P. H. Dawson et al, "Ion Storage in Three-Dimensional, Rotationally Symmetric, Quadrupole Fields. II. A Sensitive Mass Spectrometer", *The Journal of Vacuum Science and Technology,* vol. 5, No. 1, 1967, pp. 11–18.

P. H. Dawson et al, "Ion Storage in Three-Dimensional, Rotationally Symmetric, Quadrupole Fields. I. A Theoretical Treatment", *The Journal of Vacuum Science and Technology,* vol. 5, No. 1, Jul. 5, 1967, pp. 1–10.

*Primary Examiner*—Jack I. Berman
*Assistant Examiner*—James Beyer
*Attorney, Agent, or Firm*—Spencer, Frank & Schneider

[57] ABSTRACT

Minute particles are produced by holding charged nucleating particles in an electric field and supplying source particles to the region where the nucleating particles are held. The source particles adhere to the nucleating particles, thus growing minute particles with electric charges. This method permits the production of minute particles which are uniform in their mass and shape or the like. Minute particles having composite structures consisting of different kinds of substances can also be produced.

19 Claims, 5 Drawing Sheets

METHOD FOR PRODUCING MINUTE PARTICLES AND APPARATUS THEREFOR

BACKGROUND OF THE INVENTION

Field of the Invention

The present invention relates to a method for producing minute particles with electric charges, which are uniform in their shape and size and have a particle size of, for instance, not more than 0.1 μm, and an apparatus therefor.

Description of the Prior Art

There has conventionally been used, for the production of minute particles, a method which comprises reacting starting materials in a gas or liquid phase to thus cause the reaction product to precipitate out in the gas or liquid. For instance, minute particles of a metal have been produced by a method which comprises the step of precipitating the metal particles through a reaction of a gaseous substance containing the metal, such as a chloride, fluoride or carbonyl compound thereof, as a starting material at a high temperature in a reducing gas such as hydrogen gas.

Alternatively, minute particles can likewise be formed by decomposing a gaseous starting material such as those listed above in plasma. Moreover, when a starting material is vaporized, by heating, in a rare gas maintained at a pressure on the order of about 100 Pa, the resulting vapor is condensed due to quenching by the rare gas to thus give minute particles.

Furthermore, minute particles can easily be obtained through various reactions accompanied by precipitation of the resulting products in liquid phases. For instance, a method comprising adding a reducing agent such as sodium borohydride to an aqueous solution of a metal salt such as iron chloride to precipitate metallic minute particles has been used industrially.

However, the foregoing conventional methods suffer from the following drawbacks which would be major obstacles in improving the accuracy of minute particle production. In all of the foregoing methods, the size and shape of particles are adjusted through the control of reaction conditions such as concentrations of reactants and reaction temperatures. For this reason, these methods are in general insufficient from the viewpoint of control of particle size and further the resulting particles are not uniform in their shape. In other words, the particles produced by the conventional methods always have scattering in their size to some extent and accordingly, the conventional methods never permit the production of only particles having a specific size or uniform particle size.

Moreover, the conventional methods comprise reacting starting materials to precipitate the reaction product in a gas or liquid phase. This leads to an increase in impurity uptake of the resulting product. Further, the particles produced by the conventional methods have a large number of structural defects and poor crystal quality. In this respect, when it is necessary to use particles having good crystal quality, these particles must be heat-treated after the production thereof. However, these particles are fused together during the heat-treatment.

In addition to the foregoing drawbacks, the conventional methods only allow the production of only particles consisting of a single material and cannot produce particles having a composite structure composed of various combinations of different substances.

Minute particles having a particle size of not more than 0.1 μm would be expected to be useful in the fields of, for instance, catalysis, optical materials and electronic materials. However, the particles produced by the conventional methods suffer from various problems when they are used in these fields. Therefore, it would be desirable to develop a highly accurate method for producing minute particles having intended structures.

SUMMARY OF THE INVENTION

Accordingly, an object of the present invention is to provide a method for producing minute particles having a desired size and shape or minute particles having a composite structure composed of a variety of combinations of different substances.

Another object of the present invention is to provide a method for producing minute particles, which permits the production of minute particles while continuously monitoring the masses of the minute particles during growing of the same.

Still another object of the present invention is to provide a method for producing minute particles in which the growth rate of minute particles is reduced to grow them over a predetermined period of time and which thus permits the production of minute particles having a uniform shape and excellent crystal quality.

A further object of the present invention is to provide a method for producing minute particles which allows minute particles with electric charges to be produced while the charged particles are held in a relatively wide space without requiring establishment of strict holding conditions.

A still further object of the present invention is to provide an apparatus for practicing the foregoing methods according to the present invention.

In a first aspect of the present invention, a method for producing minute particles comprises the steps of:

forming a region defined by establishment of an electric field so that particles with electric charges are maintained therein;

supplying nucleating particles with electric charges to the region and holding the nucleating particles therein;

supplying at least one kind of source particles to the region; and uniting the source particles or a constituent thereof with the nucleating particles to form minute particles with electric charges while holding them within the region.

Here, the source particles may be electrically neutral atoms or molecules.

The source particles may be particles chemically reactive with the nucleating particles.

The source particles may have electric charges opposite to those carried by the nucleating particles.

The minute particles with electric charges may be formed while the kinetic energies of the nucleating particles and the growing minute particles are controlled to desired values by applying an electromagnetic field.

The nucleating particles with electric charges may be held within the region by simultaneously applying, to a central electrode arranged at the central portion of the region, an AC electric field whose intensity decreases as the distance outward from the central axis of the central electrode increases and a DC electric field which exerts, on the charged particles, a force directed towards the central electrode.

In a second aspect of the present invention, an apparatus for producing minute particles comprises:

electrode means for establishing an electric field which defines a region for holding particles with electric charges therein;

means for supplying the charged particle to the region: and means for supplying source particles to the region.

Here, the apparatus for producing may further comprise:

separate electrode means and a detecting system for determining the masses of the particles with electric charges.

The electrode means may comprise at least one central electrode and an outer electrode arranged around the central electrode, and an alternating current power supply connected to the central electrode and a direct current power supply for applying, to the AC power supply, a DC bias which exerts, on the charged particles, a force directed towards the central electrode.

A hole may be formed in the outer electrode for drawing out particles with electric charges for determining the mass thereof, the separate electrode means being positioned outside the hole so that the particles with electric charges drawn out by the separate electrode means are introduced into the detection system.

The central electrode may comprise even numbers of elemental electrodes which are symmetrically arranged. AC voltages with reversed phases are alternately applied to the elemental electrodes.

The number of the elemental electrodes may be four.

An ion-control electrode and a movable shutter for controlling the flow of ions may be positioned between the source of particles and the electrode means.

According to the present invention, if charged nucleating particles are electromagnetically held within a desired region or space defined by an electric field and if source particles are supplied to the vicinity of the charged nucleating particles, source particles such as neutral particles are polarized through the influence of the electrostatic field originated from the electric charges present on the nucleating particles. These particles are accordingly attracted by the action of the electrostatic force and come in contact with one another to finally cause adhesion to one another. At this stage, if the nucleating particles are chemically reactive with the source particles, chemical bonds are formed between these particles and thus the source particles are incorporated into the nucleating particles. As a result, minute particles grow. When growing minute particles according to this method, the following advantages can, for instance, be obtained: (1) minute-particles having intended particle sizes and structures can be obtained since it is possible to grow particles at a desired growth rate while continuously monitoring the masses of the growing particles; (2) minute particles having a composite structure formed from different substances can be arbitrarily produced by appropriately selecting the kinds of source particles; and (3) the nucleating particles themselves or the resulting minute particles themselves are not fused with each other since they carry identical charges and thus repulse each other.

The growth of particles according to the foregoing method requires charged particles having a wide mass distribution to be electromagnetically held within a desired region. According to the present invention, in particular, a DC electric field and an AC electric field are simultaneously applied to the charged particles to thus realize such a holding of these charged particles.

More specifically, a DC voltage which exerts, on the charged particles, a force for directing these charged particles towards a central electrode is applied to the central electrode to thus hold the particles within a desired region. Simultaneously, an AC electric field is established within the region, the intensity of the AC electric field decreasing as the distance from the axis of the central electrode increases. The force that the AC electric field exerts on the charged particles is a repulsive force on a time-average basis and serves to hold the charged particles within a space around the central electrode when balanced with the force exerted by the DC electric field. This allows the holding of charged particles having a wide mass distribution within the space around the central electrode.

The above and other objects, effects, features and advantages of the present invention will become more apparent from the following description of embodiments thereof taken in conjunction with the accompanying drawings.

DESCRIPTION OF THE PREFERRED EMBODIMENTS

Figure 1:
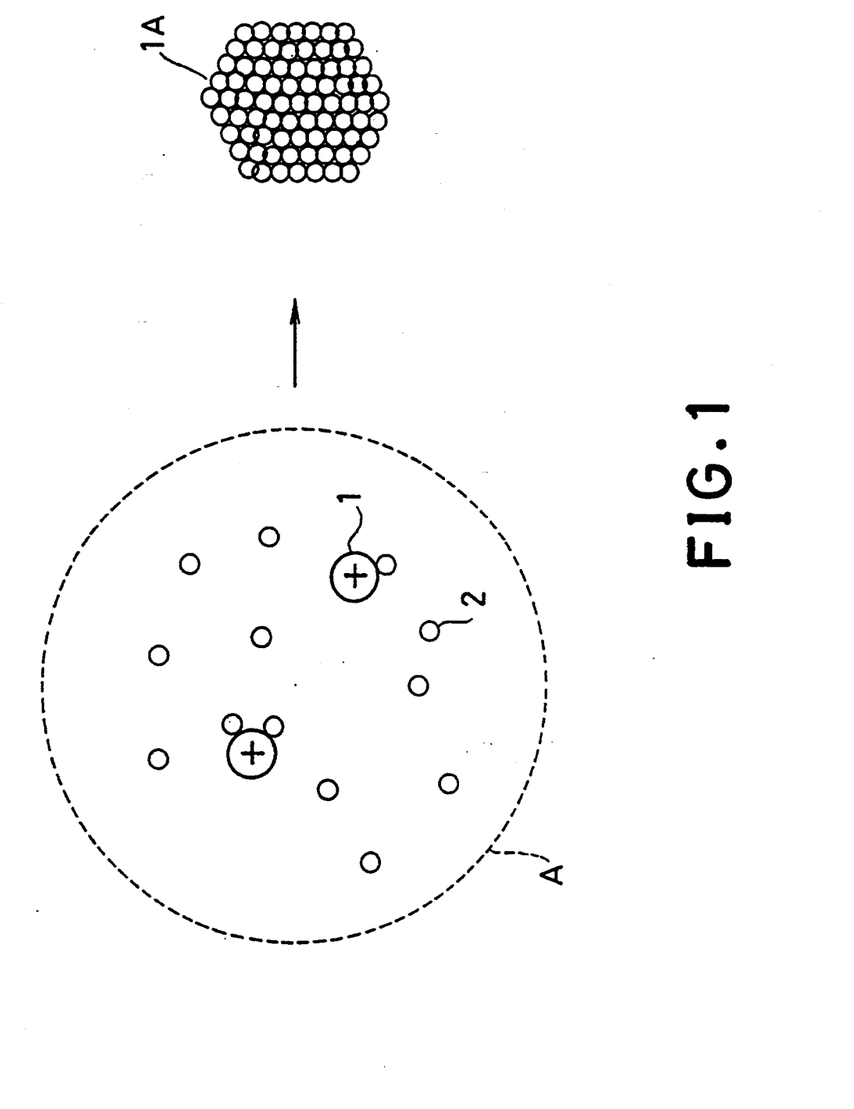
FIG. 1 is a diagram schematically illustrating the principle of the method according to the present invention.

The principle of the present invention is shown in FIG. 1. As shown in FIG. 1, if nucleating particles 1 such as ions carrying, for instance, positive charges are fed to a region or space A defined by an electric field and if source particles 2 composed of neutral atoms or molecules are supplied to the region A in the proximity of the nucleating particles 1, the source particles 2 are polarized by the electric fields generated by the electric charges of the nucleating particles 1. These polarized particles are then attracted to the nucleating particles 1 by the action of the electrostatic force and come in contact with the latter to finally cause adhesion thereto. The intended minute particles with electric charges are formed through this adhesion phenomenon. In other words, the nucleating particles and the source particles grow into minute particles 1A with electric charges. It should be noted that all-of the attached figures do not show real particles and parts for apparatuses, but simply show schematic particles and parts of apparatuses.

The source particles used herein are not restricted to specific ones and any kind of particles can be used. However, it is practical and useful to employ atoms or molecules which are in the gaseous state under the ordinary conditions.

If particles chemically reactive with the nucleating particles are used as the source particles, the source particles are adhered to the nucleating particles and react therewith to thus grow into minute charged particles having a desired particle size.

According to the method of the present invention source particles are adhered to the nucleating particles while the latter are held within a region defined by an electric field, thus growing them into minute particles with electric charges. Therefore, the method of the present invention allows the production of minute particles which are uniform in their particle size with high accuracy, unlike the conventional gas phase or liquid phase reaction. Moreover, a carrier gas or the like is not necessarily used and each kind of particle in a desired region may be used at a low density. This leads to a substantial reduction of impurity uptake.

In the method of the present invention, the source particles may have portions which do not adhere to the nucleating particles and which are released from source particles before the remaining portions of the source particles adhere to the nucleating particles. For instance, easily gasified substances such as silane ($SiH_4$) and silicon chloride may be used as the source particles to form minute particles of silicon. In this case, the chlorine and hydrogen atoms are released in the form of hydrogen and chlorine molecules having high vapor pressures while leaving Si atoms, and only the Si atoms adhere to the nucleating particles. This kind of release of gaseous byproducts is advantageous in that they remove the heat of adhesion from the minute particles that are produced.

In the method as discussed above, neutral source particles are polarized through the influence of an electric field generated by electric charges present on the nucleating particles to thus establish an electrostatic attractive force between the polarized or charged source particles and the charged nucleating particles. As a result, the source particles are electrostatically attracted to the nucleating particles and adhere thereto, and thus minute particles with electric charges grow. In other words, each particle, in itself, establishes an electric field due to the electric charge thereof or is polarized by the action of the electric field established by the counterpart thereof and these particles are attracted to one another through the resulting electrostatic attractive force. Accordingly, the adhesion cross section due to the electrostatic attractive force is far greater than the geometric cross section of the particle and this allows an effective progress of the reaction accompanied by adhesion.

Moreover, if minute particles are formed according to the conventional method and then irradiated with an electron beam to charge the minute particles, this is in general accompanied by a large energy transfer which may destroy the growing minute particles. However, the method of the present invention allows the growth of minute particles while the minute particles are always in the charged state and, therefore, techniques for controlling the position and kinetic energy of a charged particle and for detecting the mass and kinetic energy thereof during or after the growing of the particle may be used.

For instance, the mass of the charged particle can be determined by a variety of known techniques and minute particles having only a specific particle size can be produced by interrupting the growth of the minute particles at an instance when the mass thereof reaches a predetermined level or by selecting only minute particles having a desired mass after the growth thereof.

In particular, the present invention grows minute particles with electric charges while holding these particles within a region defined by an electric field and allows continuous monitoring of the masses of the growing minute particles. Therefore, the method of the present invention permits appropriate control of the growth conditions while the particles are monitored.

To produce minute particles composed of different kinds of substances by the method according to the present invention, it is sufficient to change the kind of source particles in the course of the minute particle growth. Since the method of the present invention grows minute particles while monitoring the masses of the growing minute particles as described above, it is easy to change the kind of source particles when the size of the growing minute particles reaches a predetermined level.

Alternatively, it is also possible to electrically shift growing minute particles to another position and thereby change the kind of source particles existing around the growing minute particles in place of switching the kind of source particles that are supplied.

On the other hand, the use of particles carrying electric charges opposite to those carried by the growing minute particles as source particles ensures the establishment of a stronger electrostatic attractive force between these particles and this results in an improvement of the growth efficiency.

Moreover, if two kinds of minute particles are produced and simply linked together according to the conventional methods, the combination of these linkages cannot be specified, linkages between the same kind of particles freely occur at a high frequency, and the shapes of the resulting particles are necessarily determined by the production method selected. For this reason, the conventional methods can simply produce particles of spherical symmetry or minute particles having linear or dendrite-like shapes which extend towards the direction along which crystals easily grow. In other words, the conventional methods cannot produce any minute particles having predetermined shapes.

Figure 2:
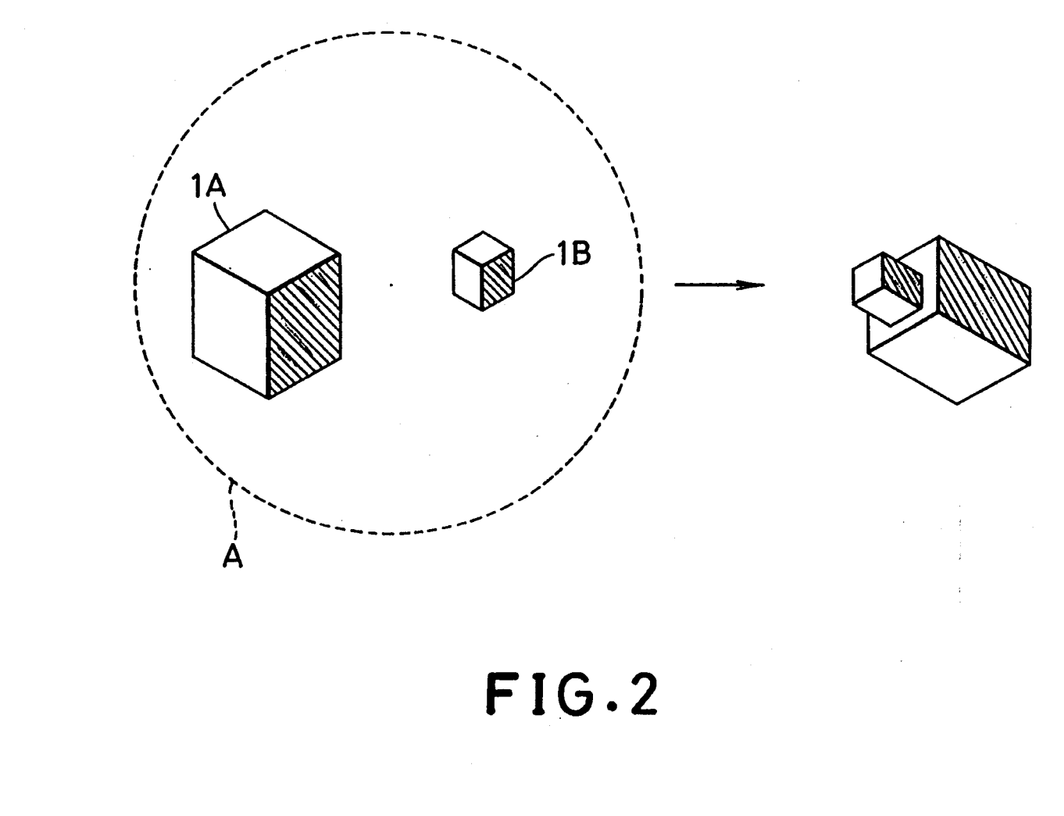
FIG. 2 is a diagram schematically illustrating the principle of another method according to the present invention.

On the contrary, according to the method of the present invention as shown in FIG. 2, after minute particles 1A are grown to some extent by feeding source particles into the region in which the charged nucleating particles are held, other particles 1B (source particles or minute particles) which have electric charges opposite to those carried by the minute particles 1A can be fed into the region A, and the minute particles 1A and 1B seem to be linked through specific faces on which these minute particles easily react. For instance, minute particles 1C having particular shapes can thus be produced through the control described above, as shown in FIG. 2 (provided that this shape does not represent the real shape of the resulting particles, but illustrates the fact that these particles cause a reaction on particular faces).

As has been discussed above, the present invention not only permits the production of minute particles, but also permits the accurate production of minute particles having fine structure through the combination of separately produced minute particles. Further the present invention allows the production of intended minute particles having composite structures consisting of different substances.

In addition, the present invention allows the kinetic energy of the growing minute particles to be established at a predetermined value by applying an appropriate electromagnetic field to the growing minute particles. Therefore if a proper kinetic energy is delivered to the nucleating particles or minute particles with electric charges (both of these will hereinafter be referred to as "charged particles"), the kinetic energies of these charged nucleating particles or minute particles are increased, the frequency of contact between the minute particles and source particles accordingly increases, and thus the growth rate thereof is improved. The term "electromagnetic field" herein means an electric field or magnetic field or both of these established by an electrode or magnetic pole. For instance, such an electromagnetic field may be established by simultaneously applying an additional AC electric voltage for changing the kinetic energy of particles to an electrode for establishing an electric field for holding nucleating particles, by applying an electric voltage to a separately disposed electrode, by establishing a magnetic field through a magnetic pole, or by using a means such as microwave heating.

Owing to the increase in the kinetic energy, the contact of the charged particles to source particles takes place at a proper relative velocity and accordingly, the reactivity thereof is improved. This results in easy incorporation of source particle into the charged particles and easy release of volatile components.

Moreover, the source particles adhered to the charged particles have appropriate kinetic energies and ensure the same effect observed when they grow under heating. For this reason, the source particles adhered thereto easily reach stable positions and this allows the production of minute particles having improved crystal quality.

If an inert gas such as helium is added to the desired region, the inert gas serves as a moderator and thus controls the moment of the source particles. The inert gas introduced to the region can remove the heat of adhesion from the minute particles that are produced and stabilizes the particle growth.

The present invention makes use of a method which comprises electromagnetically holding charged particles within a desired region and supplying source particles to the region, unlike the method comprising growing minute particles while freely moving the charged particles. Therefore, minute particles can be grown over a predetermined period of time. Thus, the crystal quality of the particles can be improved by reducing the growth rate thereof, the amount of materials consumed during growing particles can be reduced because of the restriction of the region to which source particles are fed, and the masses of the growing minute particles can easily be monitored since the masses of the minute particles with electric charges can be determined through the use of an electrode and/or magnetic pole system for holding the particles while growing the particles.

A variety of known methods can be used for holding charged particles within a desired region defined by application of an electric field. However, in the present invention, a particularly useful method for holding charged particles within the desired region comprises providing at least one central electrode, disposing an outer electrode at a position outside the central electrode, and applying an AC voltage and a DC voltage to the central electrode. This establishes an AC electric field whose intensity decreases as the distance outward from the central electrode increases and a DC electric field which exerts a force on the charged particles directing them toward the central electrode.

Figure 3:
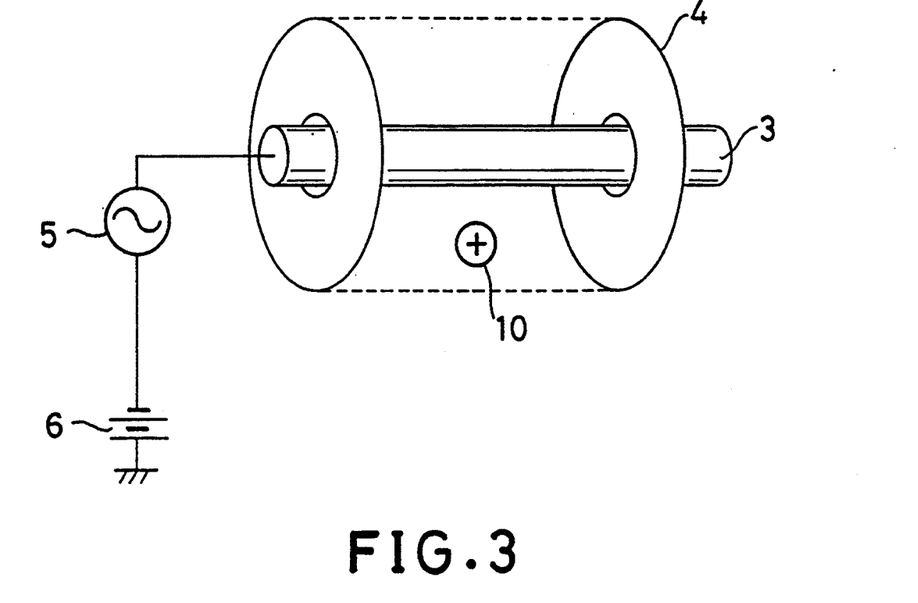
FIG. 3 is a diagram illustrating the principle of the method for holding charged particles adopted in the present invention.

FIG. 3 is a diagram showing the principle of the apparatus for holding charged particles adopted in the present invention. Reference numeral 3 represents a central electrode and reference numeral 4 represents an outer electrode arranged so as to surround central electrode 3. The electric field is established around central electrode 3 (in this case, the outer electrode has an approximately cylindrical shape).

In this respect, central electrode 3 may have a three-dimensional electrode structure such as a spherical electrode, but it would be difficult to support a spherical electrode and apply an electric voltage thereto. For this reason, there is illustrated in FIG. 3 an embodiment in which an axially symmetrical electrode is used as central electrode 3.

Figure 5:
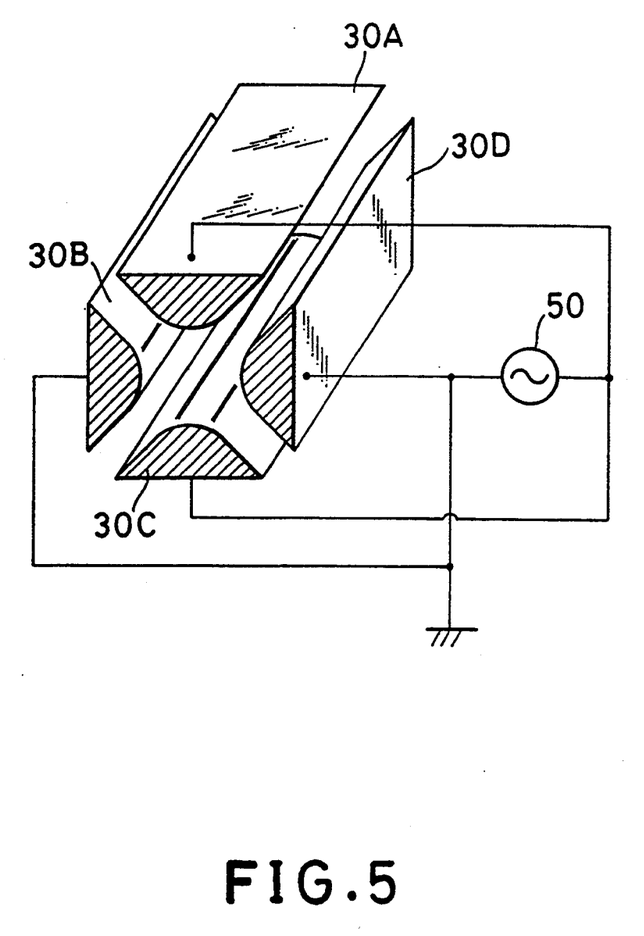
FIG. 5 is a schematic diagram illustrating the principle of a conventionally used method for holding charged particles.

On the other hand, the shape of outer electrode 4 is not important and it may have any shape so long as it can surround central electrode 3 since it is the electric field established in the proximity of central electrode 3 that is important in the present invention. Therefore, outer electrode 4 need not have a dense structure such as hyperboloids conventionally used in, for instance, mass spectrometers for the purpose of holding charged particles(for example, electrodes as shown in FIG. 5).

However, if an axially symmetrical electrode is used as central electrode 3 as shown in FIG. 3, a force for holding particles in a specific region does not act on the particles in the axial direction. Thus, outer electrodes must be likewise positioned in the proximity of both ends of the central electrode to prevent any escape of particles in the axial direction.

The holding of charged particles such as ions and electrons in a desired region is generally performed in vacuum. On the other hand, the holding thereof may be carried out under ordinary conditions, but the system must be isolated to prevent contamination by dust and electric noises. For this reason, outer electrode 4 may be a vacuum container itself, or an isolation container.

An AC power supply 5 is connected to central electrode 3 and a DC power supply 6 for applying a DC bias to AC power. supply 5 is connected to it. As a result, a DC voltage for directing charged particles towards central electrode 3 and an AC voltage are simultaneously applied to the central electrode 3.

An electric field is correspondingly established by the DC voltage applied to the central electrode 3 and exerts a force on charged particles 10 to thus hold the charged particles within a desired region. The application of-this DC voltage to the central electrode 3 permits the holding of charged particles 10 having a wide range of energies and also permits an increase of the density of the particles in the desired region, but the held charged particles 10 would finally collide with central electrode 3 were it not for the AC voltage that is simultaneously applied to central electrode 3 to prevent such collisions.

In this respect, if the intensity of the AC electric field decreases as the distance from the central electrode 3 along the outward direction increases, the force this electric field exerts on the charged particles 10 acts in the outward direction of central electrode 3 on a time-average basis. Thus, the charged particles 10 are held within a desired space through the balance between the forces exerted thereon by the DC and AC electric fields.

The method illustrated in FIG. 3 according to the present invention permits the holding of charged particles 10 in a wide space, and it is not important to establish an AC electric field having a detailed distribution as in the conventional methods. Nor is it necessary to use a central electrode having a strictly defined shape. Moreover, the method according to the present invention has an advantage in that the voltage parameters to be applied to central electrode 3 and outer electrode 4 need not be changed even if the mass of charged particle 10 is increased by 2 to 3 orders.

On the other hand, when an electrode having a simple structure is used as central electrode 3 as shown in FIG. 3, the attenuation characteristics of the AC electric field as a function of the distance from central electrode 3 are identical to the attenuation characteristics of the DC electric field as a function of the distance from central electrode 3 and, therefore, the properties accomplished by such structure are always the same.

Figure 4:
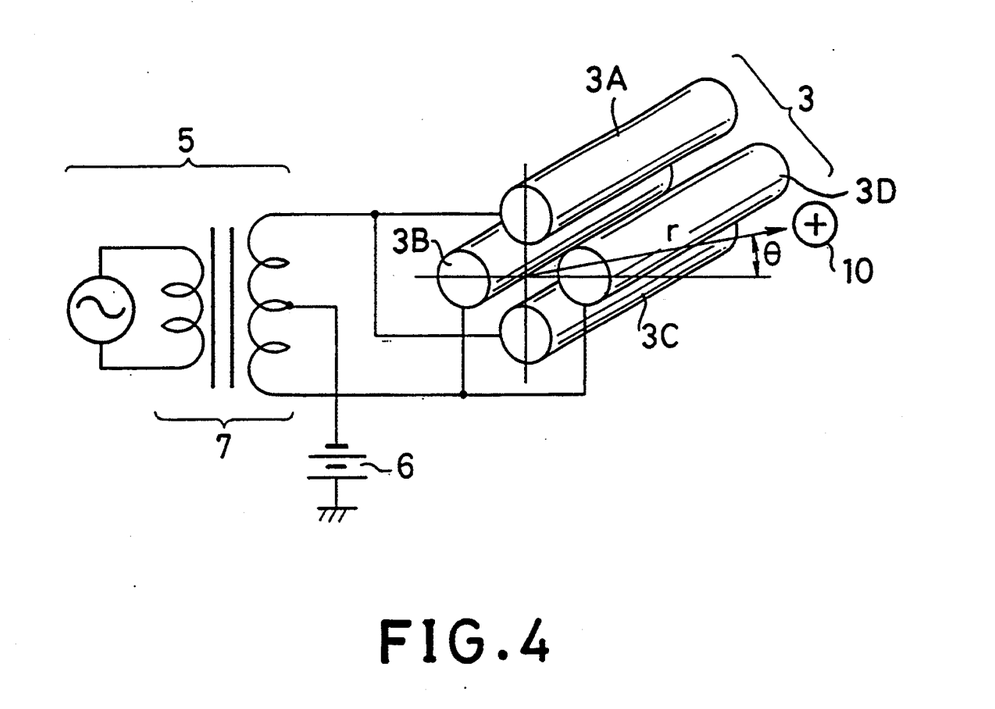
FIG. 4 is a diagram illustrating the principle of an improved method for holding charged particles as shown in FIG. 3.

FIG. 4 is a diagram illustrating the principle of an improvement of the method for holding charged particles as shown in FIG. 3. In FIG. 4, an outer electrode is omitted for simplicity and the structural parts which are identical to those shown in FIG. 3 are represented by the same reference numerals.

In this embodiment, a central electrode 3 comprises $2(N-1)$ (wherein N is an integer of not less than 2: $N=3$ for the embodiment shown in FIG. 4) cylindrical elemental electrodes 3A to 3D which are symmetrically arranged around the central axis. An AC power supply 5 is connected to elemental electrodes 3A to 3D so that AC voltages with reversed phases are alternately supplied to elemental electrodes 3A, 3C and 3B, 3D, respectively. A common DC voltage is supplied from the common DC power supply 6 on the elemental electrodes 3A to 3D. Thus, by supplying an AC voltage with reversed phase and the common DC voltage on the elemental electrodes, the attenuation characteristics of the AC and DC electric fields can be made different from each other and the holding characteristics of charged particles can be further controlled.

In the improved embodiment shown in FIG. 4, N is 3, i.e., an embodiment with a quadrupole electrode. AC power supply 5 comprises a transformer 7 and AC voltages with reversed phases are supplied to the four elemental electrodes 3A to 3D alternately.

For instance, an AC voltage is applied to elemental electrodes 3A and 3C which face each other while an AC voltage with reversed phase is applied to the remaining elemental electrodes 3B and 3D, which likewise face each other. In other words, AC voltages having opposite signs are always applied to each neighbouring two elemental electrodes, for instance, elemental electrodes 3A and 3B.

It is herein assumed that $n=N$ (wherein N is an integer of not less than 2) and that the angular frequency of the AC voltage is given by $\omega$. An AC electric field (which, in the direction of r, is $a\cos(n-1)\theta \cdot \cos\omega t / r^n$ and which, in the direction of $\theta$, is $a\sin(n-1)\theta \cdot \cos\omega t / r^n$) and a DC electric field ($=A/r$) act on a charged particle 1 (charge q, mass m) present outside central electrode 3 (wherein a and A are coefficients representing the magnitudes of the AC and DC electric fields respectively and are in proportion to voltages applied). If n is set at 1 in the foregoing formula (in this case, n is not consistent with N), it is possible to collectively discuss all cases inclusive of the embodiment as shown in FIG. 3 wherein the number of the elemental electrodes is one and the attenuation characteristics of the AC and DC electric fields as a function of the distance from the central electrode are identical to one another. Therefore, n is defined to be an integer of not less than 1 ($n \neq N$ for $n=1$; and $n=N$ for $N \geq 2$).

The foregoing AC electric field exerts, on the time-average, a force having a magnitude of $nqa^2/2m\omega^2 r^{(2n+1)}$ in the direction of r on a charged particle having a mass of m. This is a repulsive force originated from the central axis and thus the particle can be held around an equilibrium position $r_0 = (nqa^2/2m\omega^2 A)^{1/n}$ established through a balance between the repulsive force and the DC attractive force ($=A/r$).

As seen from the formula, the equilibrium position $r_0$ is in proportion to $m^{1/n}$. Thus, it will be understood that this embodiment ensures the holding of particles having a wide range of masses.

In other words, if n is 1, 2 or 3, the equilibrium position $r_0$ is in proportion to $m^1$, $m^{1/2}$ or $m^{1/6}$. For this reason, if a holding space having a radius of 10 times that of the central electrode can be provided around the central electrode, the mass ranges of particles which can be held under the influence of these electric fields are equal to $10^2$, $10^4$ and $10^6$ times for n of 1, 2 and 3 respectively.

As seen from the foregoing formula, the equilibrium position established through the balance between the repulsive force and the DC attractive force varies depending on the masses of particles to be held. Thus, particles having a variety of masses can be held within a desired region according to the method of the present invention and particles can be arranged within the desired region in the order of the largeness of mass.

In this embodiment, it is effective to use a central electrode having a large n, i.e., a central electrode consisting of a plurality of elemental electrodes, but the stability of holding (or the volume of the region available for stable holding) increases as n decreases. If these points are taken into consideration, the use of a quadrupole central electrode ($n=3$) comprising four elemental electrodes as shown in FIG. 4 is the most practicable structure for the central electrode. This quadrupole electrode permits not only the holding of charged particles outside the electrode according to the principle of the present invention, but also the holding of charged particles within the space formed inside the quadrupole electrode according to the principle of the conventional methods as discussed above (see FIG. 5).

The amount or number of charged particles incorporated into the inner space of the quadrupole electrode depends on the mass of the particles in accordance with the same principle that is conventionally used in the method for holding charged particles. Accordingly, the method according to the present invention, when a quadrupole central electrode is used, permits the holding of particles having a wide range of masses within the space outside the electrode while particles having a specific mass are held within the inner space of the quadrupole electrode.

The structure shown in FIGS. 3 or 4 is quite effective for use in the production of minute particles. For instance, passages through which particles can move from the outer portion to the inner portion of the quadrupole electrode are formed, source particles can be fed to the exterior of the quadrupole electrode to grow minute particles while charged particles are held within the outer space of the electrode, and the particles can be moved to the interior of the electrode when the mass thereof reaches a predetermined level.

An alternative method for holding charged particles within a desired region defined by the establishment of an electric field is shown in FIG. 5. This method has been adopted in, for instance, mass spectrometers. Hyperboloid-like capturing electrodes 30A to 30D are arranged as shown in FIG. 5 and a high frequency voltage is applied to these electrodes by an AC power supply 50 to establish a high frequency electric field between capturing electrodes 30A to 30D. This method may likewise be used in the present invention.

According to this method, however, charged particles are held within the space surrounded by these electrodes by keeping the charged particles away from the capturing electrodes 30A to 30D through the establishment of the high frequency electric field. Therefore, the shape of the high frequency field distribution is very important in this method and accordingly, these capturing electrodes 30A to 30D must be strictly formed into the desired shapes. Moreover, this method suffers from problems in that it cannot hold charged particles in a wide space and in that it can hold only particles having a narrow range of mass.

As has been discussed above, according to this conventional method, charged particles are kept away from the electrodes by the action of the high frequency field to thus hold the charged particles within the space surrounded by these electrodes, while in the foregoing methods shown in FIGS. 3 and 4, charged particles are held by a DC voltage and an AC voltage simply serves to prevent the charged particles from colliding with the central electrode.

Figure 6:
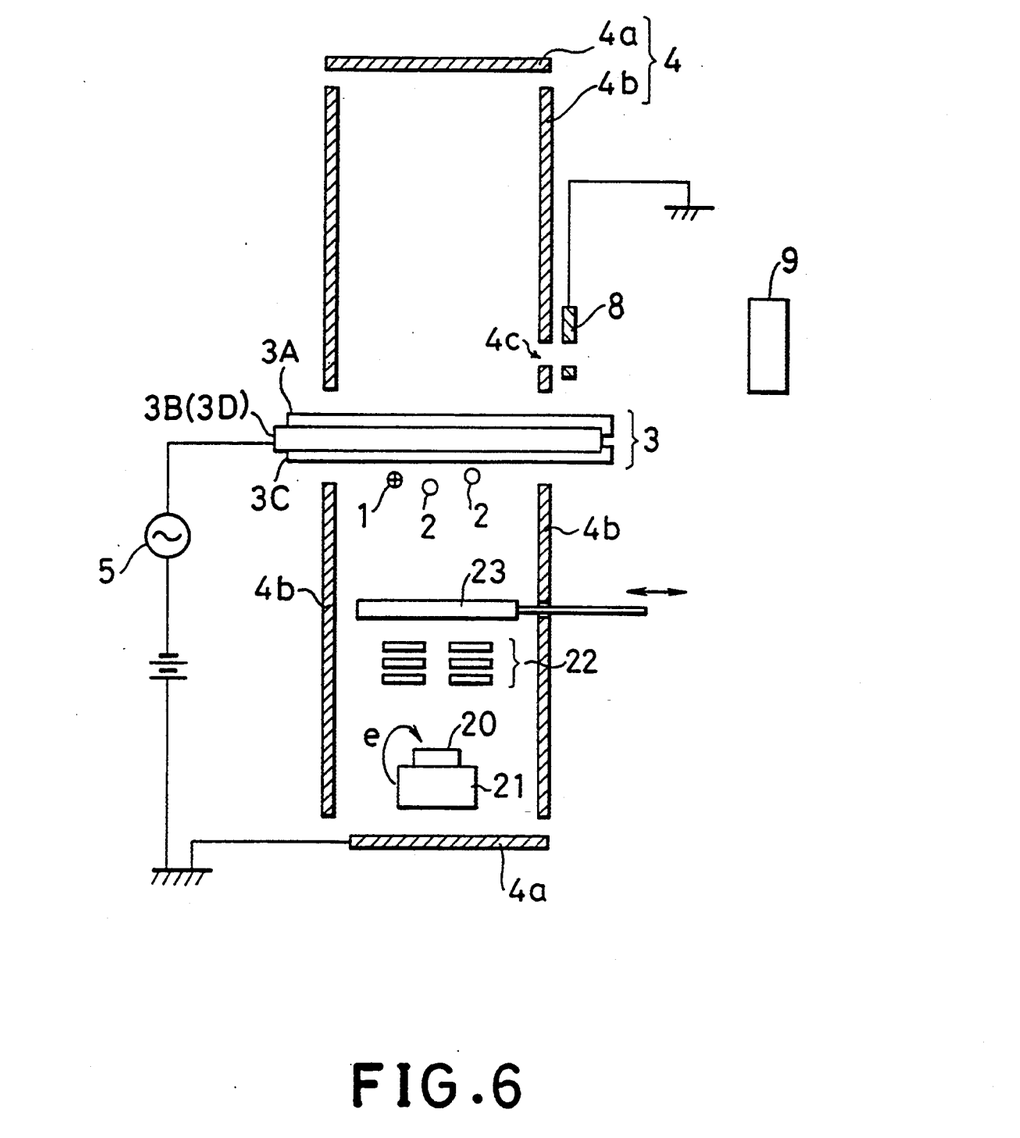
FIG. 6 is a schematic diagram showing an embodiment of the apparatus according to the present invention.

The present invention will hereinafter be explained in more detail with reference to FIG. 6. FIG. 6 is a schematic diagram showing an embodiment of an apparatus for practicing the method according to the present invention. This apparatus is suitable for use in the production of, for instance, microcrystals of Si by holding Si ions as nucleating particles and supplying Si vapor to the region in which the Si ions are held.

In this embodiment, a central electrode 3 comprises, as shown in FIG. 4, four elemental electrodes which are symmetrically arranged around the central axis. More specifically, each elemental electrode 3A to 3D comprises a cylinder of aluminum having a diameter of 1 cm, and central electrode 3 is assembled by arranging these cylindrical elemental electrodes so that the axis of each elemental electrode is positioned on the periphery of a circle centered at the central axis and having a radius of 1 cm. Moreover, notches each having a length of 1 cm, are made on the central portion of two of these four elemental electrodes (for instance, electrodes 3A and 3B) to form a passage through which particles can move from the exterior to the interior of the quadrupole electrode.

Central electrode 3 is accommodated in a vacuum container having an inner diameter of 30 cm which has been evacuated to a pressure of $10^{-7}$ Pa or lower by a turbo-molecular pump and in this case, the container per se also serves as an outer electrode 4. The distance between the outer peripheral surface 4a of the outer electrode 4 and the central axis is 15 cm.

Aluminum is used as the material for outer electrode 4 for the reason that it has a good electric conductivity, is non-magnetic and has a low probability of releasing gases in vacuum.

An opening 4c is formed in a disk-like end face 4b of outer electrode 4. An extracting electrode 8 and a channel plate 9, which is arranged at a constant distance from electrode 8, are positioned behind opening 4c. The extracting electrode 8 and channel plate 9 are used for the purpose of detecting the held charged particles and determining the mass thereof. The detection is performed by applying a negative pulse voltage to extracting electrode 8 to draw out the held charged particles and detecting the particles with a detection system comprising channel plate 9. The determination of the mass is performed according to the time-of-flight mass analysis technique. In this connection, this apparatus is designed such that a proper voltage can be applied to outer electrode 4 upon drawing charged particles out. More specifically, outer electrode 4 and extracting electrode 8 are in general grounded, but an appropriate voltage can be applied thereto, if necessary, during the drawing out of charged particles.

An electron beam evaporation device 21 is disposed inside outer electrode 4 so that ions and neutral vapor of Si can be simultaneously supplied by heating an evaporation material 20 of polycrystalline Si placed on evaporation device 21 through irradiation with an electron beam. Moreover, an ion-control electrode 22 and a movable shutter 23 for controlling the flow of ions are arranged between evaporation material 20 and the foregoing holding electrodes 3.

Growth of Si minute particles was carried out under the following conditions using the apparatus described above. Using a circuit provided with a transformer 7 as shown in FIG. 4, a DC voltage of $-12$ V was applied to all of four elemental electrodes 3A to 3D and simultaneously AC voltages with reversed phases were alternately applied to the elemental electrodes 3A to 3D. The AC voltage had a frequency of 85 KHz and a root-mean-square voltage of 310 $V_{rms}$.

While maintaining the foregoing voltages electron beam evaporation device 21 was activated and a pulse-like voltage of $-10$ V was applied to ion-control electrode 22 to draw silicon ions as nucleating particles (and neutral silicon atoms), and to thus hold Si ions around the central electrode 3. Then the Si ions were held within a region under these conditions. Simultaneously neutral Si vapor was fed by electron beam evaporation device 21 to the region in which the Si ions were held to thus grow Si minute particles in which the Si ions served as nucleating particles. During the growth, He gas with a pressure of $10^{-3}$ Pa was introduced into the vacuum container to stabilize the growth.

A voltage of $+50$ V was applied to ion-control electrode 22 while shutter 23 was open so that only neutral Si vapor was fed to the region in an amount of about $10^{-4}$ Pa expressed in terms of pressure in the holding space while preventing any inflow of ions into the region and any outflow thereof from the region. The neutral Si vapor was fed thereto over a period of time under these conditions, and then the growth of particles was observed through monitoring the masses of the held particles by the time-of-flight mass analysis method using channel plate 9. It was found that the mass of the particles increased up to a value corresponding to a number of vapor particles equal to about $2 \times 10^4$ within a growth time of 30 minutes. At the same time, it was demonstrated, by shifting the position of the opening of extracting electrode 8, that the particles whose masses were increased in this way were positioned in the proximity of central electrode 3.

It was also confirmed, through the determination performed using the same channel plate 9, that particles having such a mass were held within the inner space of these four elemental electrodes 3A to 3D and that the particles held therein had a low scattering of masses and thus were uniform in their size. Further the particles held within the inner space of elemental electrodes 3A to 3D were collected on a thin membrane support for microscopic observation, were observed by a transmission electron microscope, and were found to be Si crystals having a size of about 10 nm. Moreover, the electron diffraction pattern thereof was observed by a transmission electron microscope and it was found that the Si particles were single crystals.

Oxygen gas was fed to the region in which the Si particles grown under the foregoing conditions were held around central electrode 3 at a pressure of $10^{-3}$ Pa and the particles were allowed to stand for one hour to improve the quality of the surface of these particles through oxidation. Thereafter, the particles thus treated were collected and observed by a transmission electron microscope. Thus, it was found that surface properties of the particles were changed.

This clearly indicates that the present invention makes it possible to oxidize the surface of Si microcrystals while holding them within a specific space. Accordingly, composite particles comprising Si and silicon oxide can be produced.

Incidentally, it would be quite difficult for such a treatment accompanied by a change of mass to be carried out according to the conventionally known method for holding particles (for instance, the method illustrated in FIG. 5), since parameters for holding the particles would need to be changed along with a change of mass and further an opening for the supplying gas would need to be formed through holding electrodes. On the contrary, the method illustrated in FIG. 3 or 4 easily allows the practice of such treatment without changing the shape of the electrodes and the parameters.

Separately, an attempt was made to hold Si ions and to grow minute particles using Si ions as nucleating particles while the foregoing voltage conditions were changed as follows: a DC voltage of $-25$ V and an AC voltage having a frequency of 150 KHz and a root-mean-square voltage of 400 $V_{rms}$ were used.

In this case, the largest minute particles which could be produced by the method comprised about $6\times 10^3$ Si atoms and had a size of about 5 nm. However, the ability to hold particles was improved in proportion to the increase of the applied DC voltage and thus the number of particles which could be grown through a single growth operation could be increased up to about 2 times.

Si minute particles which also contain arsenic atoms can be grown in the same manner by using arsenic ions as nucleating particles and supplying neutral Si atoms. To this end, an arsenic ion source is provided in addition to an evaporation device 21, and arsenic ions are fed to a region around the central electrode 3 through an ion-control electrode 22 in the same manner described above. Then neutral Si atoms are supplied to the region through evaporation device 21 to grow minute particles in which the arsenic ions which are held in the region serve as the nucleating particles. This method permits the growth of minute particles which comprises electrically active impurities such as arsenic with certainty. It would be difficult for the conventional methods to produce minute particles having such a composite composition.

In addition to Si atoms, gases of Si compounds such as silane ($SiH_4$) or dichlorosilane ($SiCl_2H_2$) can likewise be used as source particles for the growth of Si minute particles. In this case, most of the hydrogen and chlorine atoms present in the compounds are released when these source particles are deposited on the nucleating particles. The use of a gas of such a compound allows stable supply of the source particles over a long time period as compared with that achieved by evaporation device 21.

A plurality of source particles can be used to grow minute particles. For instance, minute particles mainly comprising $SiO_2$ can be grown by supplying oxygen gas at a pressure of $10^{-3}$ Pa and simultaneously supplying neutral Si atoms at a pressure of $10^{-4}$ Pa using evaporation source 21.

If the apparatus shown in FIG. 6 is employed, minute particles of a variety of substances such as Mo, W, Al, C, Ni and Fe, in addition to Si, can be grown by simply replacing the substance to be charged in evaporation device 21. Furthermore oxygen gas can be supplied simultaneously with the supply of, for instance, Al to grow minute particles of aluminum oxide, $Al_2O_3$.

As has been explained above in detail, the present invention permits the production of minute particles which are uniform in their size and shape or the like and which likewise permits the production of minute particles having composite structures consisting of different kinds of substances.

The present invention has been described in detail with respect to preferred embodiments thereof, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for producing minute particles, comprising the steps of:
   forming a region defined by establishment of an electric field so that particles with electric charges are maintained therein;
   supplying nucleating particles with electric charges to said region;
   holding said nucleating particles within said region;
   supplying at least one kind of source particles to said region;
   uniting the source particles or a constituent thereof with said nucleating particles to form minute particles with electric charges; and
   holding said minute particles with electric charges within said region until said minute particles grow by said uniting step to have a desired particle size.

2. The method for producing minute particles as claimed in claim 1, wherein the source particles are electrically neutral atoms.

3. The method for producing minute particles as claimed in claim 1, wherein the source particles are particles which are chemically reactive with the nucleating particles.

4. The method for producing minute particles as claimed in claim 1, wherein the source particles have electric charges opposite to those carried by the nucleating particles.

5. The method for producing minute particles as claimed in claim 1, wherein the minute particles with electric charges are formed while the kinetic energies of the nucleating and growing minute particles are controlled to desired values by applying an electromagnetic field.

6. The method for producing minute particles as claimed in claim 1, wherein the minute particles with electric charges are formed in an atmosphere of a gas which is chemically inactive with the nucleating and minute particles with electric charges.

7. The method for producing minute particles as claimed in claim 1, wherein the nucleating and minute particles with electric charges are held within the region by simultaneously applying, to a central electrode which is arranged at central portion of the region and which has a central axis, an AC electric field whose intensity decreases as the distance outward from the central axis of the central electrode increases and a DC electric field which exerts, on the charged particles, a force directing towards the central electrode.

8. The method for producing minute particles as claimed in claim 7, wherein the nucleating particles are silicon ions and the source particles are silicon vapor.

9. An apparatus for producing minute particles, comprising:
   electrode means for establishing an electric field which defines a region for holding particles with electric charges therein;
   means for supplying nucleating particles with electric charges to said region; and
   means for supplying source particles to said region, said source particles or a constituent thereof uniting with said nucleating particles in said region.

10. The apparatus for producing minute particles as claimed in claim 9, further comprising:
    separate electrode means and a detecting system for determining the masses of particles with electric charges.

11. The apparatus for producing minute particles as claimed in claim 9, wherein the electrode means comprises at least one central electrode an outer electrode arranged around the at least one central electrode, an alternating current power supply connected to the at least one central electrode, and a direct current power supply for applying, to the AC power supply, a DC bias which exerts, on the charged particles, a force directed towards the at least one central electrode.

12. The apparatus for producing minute particles as claimed in claim 11, wherein a hole is formed in said outer electrode for drawing particles with electric charges out of said region for determining the mass thereof, the separate electrode means being positioned outside the hole so that the particles with electric charges drawn out by the separate electrode means are introduced into the detection system.

13. The apparatus for producing minute particles as claimed in claim 11, wherein the at least one central electrode comprises an even number of elemental electrodes symmetrically arranged around a central axis, and the AC power supply is connected to these elemental electrodes so that AC voltages with reversed phases are alternately applied to the elemental electrodes.

14. The apparatus for producing minute particles as claimed in claim 13, wherein the number of the elemental electrodes is four.

15. The apparatus for producing minute particles as claimed in claim 14, wherein an ion-control electrode and a movable shutter for controlling the flow of ions are positioned between a source of particles and the elemented electrodes.

16. The apparatus for producing minute particles as claimed in claim 15, wherein a hole is formed in said outer electrode for drawing particles with electric charges out of said region for determining the mass thereof, the separate electrode means being positioned outside the hole so that the particles with electric charges drawn out by the separate electrode means are introduced into the detection system.

17. An apparatus for producing minute particles comprising:
    an even number of elemental electrodes symmetrically arranged in a region;
    an AC power supply connected to the elemental electrodes so that AC voltages with reversed phases are alternately applied to elemental electrodes;
    a DC power supply which applies a DC bias to the AC voltages applied to the elemental electrodes;
    means for supplying nucleating particles with electric charges to the region, the nucleating particles being held in the region by an electric field produced by the AC and DC power supplies; and
    means for supplying source particles to the region, the source particles or a constituent thereof uniting with the nucleating particles to grow the minute particles.

18. The apparatus for producing minute particles as claimed in claim 17, wherein the number of the elemental electrodes is four.

19. The method for producing minute particles as claimed in claim 1, wherein the source particles are electrically neutral molecules.

* * * * *